(12) United States Patent
Hanan

(10) Patent No.: US 12,246,885 B2
(45) Date of Patent: Mar. 11, 2025

(54) CONTAINER PREFORM WITH THREADED TAMPER EVIDENCE FINISH

(71) Applicant: NIAGARA BOTTLING, LLC, Diamond Bar, CA (US)

(72) Inventor: Jay Clarke Hanan, Glendora, CA (US)

(73) Assignee: Niagara Bottling, LLC, Diamond Bar, CA (US)

( * ) Notice: Subject to any disclaimer, the term of this patent is extended or adjusted under 35 U.S.C. 154(b) by 0 days.

(21) Appl. No.: 17/930,011

(22) Filed: Sep. 6, 2022

(65) Prior Publication Data

US 2023/0069550 A1 Mar. 2, 2023

Related U.S. Application Data

(63) Continuation of application No. 16/525,890, filed on Jul. 30, 2019, now abandoned.
(Continued)

(51) Int. Cl.
*B65D 41/34* (2006.01)
*B29B 11/08* (2006.01)
(Continued)

(52) U.S. Cl.
CPC .............. *B65D 41/34* (2013.01); *B29B 11/08* (2013.01); *B29C 49/06* (2013.01); *B65D 1/0246* (2013.01);
(Continued)

(58) Field of Classification Search
CPC ... B29B 11/14726; B29B 11/08; B29B 11/14; B29C 2949/0733; B29C 2949/0777;
(Continued)

(56) References Cited

U.S. PATENT DOCUMENTS 2,947,432 A 8/1960 Marcel
3,029,963 A 4/1962 Heinz
(Continued)

FOREIGN PATENT DOCUMENTS

CN 101234688 A 8/2008
CN 102848559 A 1/2013
(Continued)

OTHER PUBLICATIONS

European Patent Office Extended Search Report for Related Application No. 20763607.7 dated Oct. 5, 2022 (5 pages).
(Continued)

*Primary Examiner* — Kareen K Thomas
(74) *Attorney, Agent, or Firm* — Michael Best & Friedrich LLP

(57) ABSTRACT

A preform for being blow-molded to form a container is provided herein. The preform comprises a finish portion that includes an opening to an interior of the preform and includes a tamper evidence ledge. The tamper evidence ledge cooperates with a tamper-evident ring portion of a cap to indicate that the cap has not been previously loosened after being installed by the manufacturer. A neck portion is disposed adjacent to the tamper evidence ledge. A tapered portion transitions from a diameter of the neck portion to a smaller diameter of a cylindrical portion. The cylindrical portion comprises an elongate member that culminates in an end cap. Threads disposed on the finish portion are configured to threadably receive the cap. A handling valley is disposed between the tamper evidence ledge and the threads. The handling valley enables gripping fingers to engage with and air-convey the container along a manufacturing assembly.

19 Claims, 6 Drawing Sheets

Related U.S. Application Data

(60) Provisional application No. 62/712,115, filed on Jul. 30, 2018.

(51) Int. Cl.
  *B29C 49/06* (2006.01)
  *B65D 1/02* (2006.01)
  *B29L 31/00* (2006.01)

(52) U.S. Cl.
  CPC ............... *B29C 2949/0777* (2022.05); *B29L 2031/7158* (2013.01)

(58) Field of Classification Search
  CPC ............ B29C 49/06; B29C 2949/0715; B29C 49/071; B29C 49/4205; B29C 49/42087; B29C 49/42099; B29C 2049/023; B29C 2949/0731; B29C 2949/0732; B29C 2949/0769; B29C 2949/0771; B29C 2949/0778; B29K 2067/003; B29L 2031/7158; B65D 41/34; B65D 1/0246
  See application file for complete search history.

(56) References Cited

U.S. PATENT DOCUMENTS

| | | |
|---|---|---|
| 3,032,809 A | 5/1962 | Willard |
| 3,303,249 A | 2/1967 | Strauss |
| 3,335,889 A | 8/1967 | Brumme |
| 3,438,578 A | 4/1969 | Peterson et al. |
| 3,769,394 A | 10/1973 | Latrielle |
| 3,773,205 A | 11/1973 | Keller et al. |
| 3,809,365 A | 5/1974 | Loffler |
| 3,850,328 A | 11/1974 | Guala |
| 3,850,329 A | 11/1974 | Robinson |
| 3,901,403 A | 8/1975 | Menke |
| D252,530 S | 7/1979 | Budish |
| 4,197,955 A | 4/1980 | Luenser |
| 4,316,551 A | 2/1982 | Belokin, Jr. |
| 4,374,878 A | 2/1983 | Jakobsen et al. |
| 4,436,212 A | 3/1984 | Alejandro Llera |
| 4,526,279 A | 7/1985 | Weiler et al. |
| 4,579,241 A | 4/1986 | Hayes |
| 4,674,643 A | 6/1987 | Wilde et al. |
| D294,462 S | 3/1988 | Ota et al. |
| 4,744,478 A | 5/1988 | Hahn |
| 4,744,479 A | 5/1988 | Schottli |
| 4,744,480 A | 5/1988 | Luch et al. |
| 4,756,439 A | 7/1988 | Perock |
| 4,818,575 A | 4/1989 | Hirata et al. |
| 4,847,129 A | 7/1989 | Collette et al. |
| 4,850,850 A | 7/1989 | Takakusaki et al. |
| 4,863,046 A | 9/1989 | Collette et al. |
| 4,895,265 A | 1/1990 | Luch et al. |
| 4,907,709 A | 3/1990 | Abe et al. |
| 4,927,680 A | 5/1990 | Collette et al. |
| 4,948,001 A | 8/1990 | Magly |
| 5,011,648 A | 3/1991 | Garver et al. |
| D315,869 S | 4/1991 | Collette |
| 5,008,066 A | 4/1991 | Mueller |
| 5,009,324 A | 4/1991 | Ochs |
| 5,061,173 A | 10/1991 | Julian et al. |
| D321,830 S | 11/1991 | York et al. |
| 5,067,622 A | 11/1991 | Garver et al. |
| 5,092,475 A | 3/1992 | Krishnakumar et al. |
| 5,097,974 A | 3/1992 | Rozenberg |
| 5,103,991 A | 4/1992 | Collins |
| 5,116,565 A | 5/1992 | Yoshino et al. |
| 5,133,468 A | 7/1992 | Brunson et al. |
| 5,137,163 A | 8/1992 | Moore |
| 5,178,289 A | 1/1993 | Krishnakumar et al. |
| 5,182,122 A * | 1/1993 | Uehara ............... B29C 49/66 264/528 |
| 5,199,588 A | 4/1993 | Hayashi |
| 5,213,225 A | 5/1993 | King et al. |
| 5,248,050 A | 9/1993 | Janousch et al. |
| 5,255,889 A | 10/1993 | Collette et al. |
| 5,279,433 A | 1/1994 | Krishnakumar et al. |
| 5,281,387 A | 1/1994 | Collette et al. |
| D345,693 S | 4/1994 | Edstrom |
| 5,303,833 A | 4/1994 | Hayashi et al. |
| 5,303,834 A | 4/1994 | Krishnakumar et al. |
| 5,314,084 A | 5/1994 | Flota et al. |
| 5,337,909 A | 8/1994 | Vailliencourt |
| 5,340,302 A | 8/1994 | Ingram |
| 5,341,946 A | 8/1994 | Vailliencourt et al. |
| D352,238 S | 11/1994 | Vailliencourt et al. |
| D352,245 S | 11/1994 | Krishnakumar et al. |
| 5,360,126 A | 11/1994 | Snyder et al. |
| 5,366,774 A | 11/1994 | Pinto et al. |
| 5,381,910 A | 1/1995 | Sugiura et al. |
| 5,407,086 A | 4/1995 | Ota et al. |
| D358,766 S | 5/1995 | Vailliencourt et al. |
| 5,411,699 A | 5/1995 | Collette et al. |
| 5,455,088 A | 10/1995 | Deemer |
| D364,565 S | 11/1995 | Vailliencourt et al. |
| D366,416 S | 1/1996 | Semerskv |
| D366,417 S | 1/1996 | Semerskv |
| 5,487,481 A | 1/1996 | Sander et al. |
| 5,494,174 A | 2/1996 | Rohr et al. |
| 5,509,552 A | 4/1996 | Eguchi et al. |
| 5,511,677 A | 4/1996 | Oder |
| 5,498,152 A | 5/1996 | Uterlander et al. |
| 5,632,397 A | 5/1997 | Fandeux et al. |
| 5,645,183 A | 7/1997 | Slat et al. |
| 5,669,520 A | 9/1997 | Simpson |
| 5,704,503 A | 1/1998 | Krishnakumar et al. |
| D391,168 S | 2/1998 | Qqq |
| D393,802 S | 4/1998 | Collette et al. |
| 5,740,932 A | 4/1998 | Bettegazzore |
| 5,743,419 A | 4/1998 | King |
| 5,749,201 A | 5/1998 | Cochrane |
| 5,756,172 A * | 5/1998 | Semersky ............ B29C 49/071 215/10 |
| 5,762,221 A | 6/1998 | Tobias et al. |
| 5,792,491 A | 8/1998 | Chaure |
| 5,795,598 A | 8/1998 | Wohlgemuth et al. |
| D397,614 S | 9/1998 | Krishnakumar et al. |
| 5,804,016 A * | 9/1998 | Schmidt ............... B65D 1/0215 264/513 |
| D402,895 S | 12/1998 | Takahashi et al. |
| 5,850,681 A | 12/1998 | La Barre |
| D404,308 S | 1/1999 | Takahashi et al. |
| 5,888,598 A * | 3/1999 | Brewster ............ B29C 49/0005 264/513 |
| D407,649 S | 4/1999 | McCallister et al. |
| D407,650 S | 4/1999 | Takahashi et al. |
| D411,453 S | 6/1999 | Piccioli et al. |
| 5,908,128 A | 6/1999 | Krishnakumar et al. |
| 5,915,579 A | 6/1999 | Przytulla et al. |
| D413,519 S | 9/1999 | Eberle et al. |
| 5,971,184 A | 10/1999 | Krishnakumar et al. |
| 5,975,321 A | 11/1999 | Luch |
| 5,988,417 A | 11/1999 | Chena et al. |
| 6,016,932 A | 1/2000 | Gaydosh et al. |
| D419,882 S | 2/2000 | Bretz et al. |
| D420,592 S | 2/2000 | Bretz et al. |
| 6,036,037 A | 3/2000 | Scheffer et al. |
| D423,365 S | 4/2000 | Eberle et al. |
| 6,044,996 A | 4/2000 | Carew et al. |
| 6,044,997 A | 4/2000 | Oaa |
| 6,062,409 A | 5/2000 | Eberle |
| D426,460 S | 6/2000 | Krishnakumar et al. |
| D427,905 S | 7/2000 | Eberle |
| 6,089,390 A * | 7/2000 | Druitt ................ B65D 41/3447 215/307 |
| 6,092,688 A | 7/2000 | Eberle et al. |
| D429,647 S | 8/2000 | Warner et al. |
| D430,493 S | 9/2000 | Weick |
| 6,112,925 A | 9/2000 | Nahill et al. |
| 6,113,841 A | 9/2000 | Nielsen |
| D434,330 S | 11/2000 | Rowe et al. |
| D440,157 S | 4/2001 | Lichtman et al. |
| D440,158 S | 4/2001 | Bretz et al. |

(56) References Cited

U.S. PATENT DOCUMENTS

| | | |
|---|---|---|
| D440,877 S | 4/2001 | Lichtman et al. |
| D441,294 S | 5/2001 | Lichtman et al. |
| 6,230,912 B1 | 5/2001 | Rashid |
| 6,248,413 B1 | 6/2001 | Barel et al. |
| D445,033 S | 7/2001 | Bretz et al. |
| 6,257,433 B1 | 7/2001 | Ogg et al. |
| 6,260,723 B1 | 7/2001 | Bergholtz |
| D446,126 S | 8/2001 | Bretz et al. |
| D447,411 S | 9/2001 | Lichtman et al. |
| 6,296,131 B2 | 10/2001 | Rashid |
| 6,347,717 B1 | 2/2002 | Eberle |
| D454,500 S | 3/2002 | Bretz et al. |
| 6,382,444 B1 | 5/2002 | Nyman |
| D465,158 S | 11/2002 | Peek et al. |
| D466,021 S | 11/2002 | Thieriunq et al. |
| D466,819 S | 12/2002 | Darr et al. |
| 6,494,333 B2 | 12/2002 | Sasaki et al. |
| D469,358 S | 1/2003 | Bryant et al. |
| D469,359 S | 1/2003 | Bryant et al. |
| D469,695 S | 2/2003 | Brvant et al. |
| D469,696 S | 2/2003 | Brvant et al. |
| D470,773 S | 2/2003 | Darr et al. |
| 6,523,710 B1 | 2/2003 | Hidding et al. |
| D472,470 S | 4/2003 | Bretz et al. |
| 6,554,146 B1 | 4/2003 | DeGroff et al. |
| D476,236 S | 6/2003 | Unqradv et al. |
| 6,585,125 B1 | 7/2003 | Peek |
| D479,690 S | 9/2003 | DeGroff |
| 6,616,001 B2 | 9/2003 | Saito et al. |
| D480,957 S | 10/2003 | Mooney et al. |
| D485,765 S | 1/2004 | Thieriunq et al. |
| 6,682,794 B1 | 1/2004 | Horn et al. |
| 6,722,514 B2 | 4/2004 | Renz |
| 6,739,467 B2 | 5/2004 | Saito et al. |
| D494,475 S | 8/2004 | Thieriunq et al. |
| D497,551 S | 10/2004 | Gamel et al. |
| 6,830,158 B2 | 12/2004 | Yourist |
| 6,841,262 B1 | 1/2005 | Beck et al. |
| D502,108 S | 2/2005 | Gamel et al. |
| D503,625 S | 4/2005 | Nelson et al. |
| D503,885 S | 4/2005 | Bretz et al. |
| D504,063 S | 4/2005 | Bretz et al. |
| D506,675 S | 6/2005 | Bretz et al. |
| D506,676 S | 6/2005 | Bretz et al. |
| D506,677 S | 6/2005 | Bretz et al. |
| D507,491 S | 7/2005 | Bretz et al. |
| D507,609 S | 7/2005 | Bretz et al. |
| D507,749 S | 7/2005 | Bretz et al. |
| D508,857 S | 8/2005 | Bretz et al. |
| 6,932,230 B2 | 8/2005 | Pedmo et al. |
| 6,938,787 B2 | 9/2005 | Shinozaki |
| D510,526 S | 10/2005 | Bretz et al. |
| 7,025,219 B2 | 4/2006 | Heisner et al. |
| 7,032,770 B2 | 4/2006 | Finlav et al. |
| D525,530 S | 7/2006 | Livingston et al. |
| 7,077,933 B2 | 7/2006 | Otani et al. |
| D527,643 S | 9/2006 | Gottlieb |
| 7,172,087 B1 | 2/2007 | Axe et al. |
| D538,660 S | 3/2007 | Gatewood |
| 7,198,164 B2 | 4/2007 | Yourist et al. |
| D548,106 S | 8/2007 | Martinez et al. |
| 7,258,244 B2 | 8/2007 | Unqradv |
| D551,081 S | 9/2007 | Ohara et al. |
| 7,267,242 B2 | 9/2007 | Tanaka et al. |
| D555,499 S | 11/2007 | Ross |
| 7,334,695 B2 | 2/2008 | Bvsick et al. |
| 7,334,696 B2 | 2/2008 | Tanaka et al. |
| 7,347,339 B2 | 3/2008 | Banqi et al. |
| 7,364,046 B2 | 4/2008 | Joshi et al. |
| 7,416,089 B2 | 8/2008 | Kraft et al. |
| 7,416,090 B2 | 8/2008 | Mooney et al. |
| D579,339 S | 10/2008 | Shmagin |
| 7,451,886 B2 | 11/2008 | Lisch et al. |
| D584,627 S | 1/2009 | Leooitevin |
| 7,510,094 B1 | 3/2009 | Willis et al. |
| D598,779 S | 8/2009 | Leooitevin |
| 7,637,384 B2 | 12/2009 | Price et al. |
| D610,015 S | 2/2010 | Yourist et al. |
| 7,694,842 B2 | 4/2010 | Melrose |
| 7,699,183 B2 | 4/2010 | Matsuoka et al. |
| 7,748,551 B2 | 7/2010 | Gatewood et al. |
| 7,748,552 B2 | 7/2010 | Livingston et al. |
| 7,757,874 B2 | 7/2010 | Ross |
| D621,271 S | 8/2010 | Soni |
| 7,770,745 B2 | 8/2010 | Weissmann et al. |
| 7,780,025 B2 | 8/2010 | Simpson, Jr. et al. |
| D623,529 S | 9/2010 | Yourist et al. |
| D624,427 S | 9/2010 | Yourist et al. |
| 7,798,349 B2 | 9/2010 | Maczek et al. |
| 7,819,264 B2 | 10/2010 | Brozell et al. |
| 7,824,166 B2 | 11/2010 | Mie et al. |
| D630,515 S | 1/2011 | Bretz et al. |
| 7,861,876 B2 | 1/2011 | Stowitts |
| 7,927,678 B2 | 4/2011 | Mitadera et al. |
| 7,942,287 B2 | 5/2011 | King |
| 7,980,404 B2 | 7/2011 | Trude et al. |
| 8,020,717 B2 | 9/2011 | Patel |
| 8,047,388 B2 | 11/2011 | Kelley et al. |
| 8,091,720 B2 | 1/2012 | Colloud |
| 8,091,724 B2 | 1/2012 | King |
| 8,141,793 B2 | 3/2012 | Wallis et al. |
| 8,268,216 B2 | 9/2012 | Meador |
| 8,308,002 B2 | 11/2012 | Penny |
| 8,308,007 B2 | 11/2012 | Mast et al. |
| 8,328,033 B2 | 12/2012 | Mast |
| 8,328,038 B2 | 12/2012 | Major |
| 8,381,496 B2 | 2/2013 | Trude et al. |
| 8,528,759 B2 | 9/2013 | Pucci |
| 8,544,663 B2 | 10/2013 | Barel et al. |
| 8,544,666 B2 | 10/2013 | Velmer et al. |
| 8,663,761 B2 | 3/2014 | Kwirandt et al. |
| 8,728,601 B2 | 5/2014 | Hutts et al. |
| 8,794,461 B2 | 8/2014 | Major |
| 8,815,356 B2 | 8/2014 | Huettner |
| 8,827,688 B2 | 9/2014 | Maki et al. |
| 8,851,310 B2 | 10/2014 | Pucci |
| 9,033,168 B2 * | 5/2015 | Darr ................ B65D 1/0246 215/42 |
| 9,221,596 B2 | 12/2015 | Patel et al. |
| 9,233,771 B2 | 1/2016 | Siegl |
| 9,359,099 B2 * | 6/2016 | Zoppas ................ B65D 1/023 |
| 9,815,604 B2 | 11/2017 | Ekkert |
| 9,878,831 B2 | 1/2018 | Danielsson et al. |
| 9,994,350 B2 | 6/2018 | Labadie et al. |
| 10,118,724 B2 | 11/2018 | Hanan |
| 10,329,043 B2 | 6/2019 | Hanan |
| 10,377,534 B2 | 8/2019 | Hanan |
| 10,569,924 B2 * | 2/2020 | Jarman ................ B65D 1/0207 |
| 10,647,465 B2 | 5/2020 | Hanan |
| 10,829,260 B2 | 11/2020 | Hanan |
| 10,919,671 B2 | 2/2021 | Hanan |
| 10,974,859 B2 * | 4/2021 | Jarman ................ B65D 1/023 |
| 10,987,851 B2 | 4/2021 | Hanan |
| 11,142,364 B2 | 10/2021 | Hanan |
| 11,472,093 B2 | 10/2022 | Hanan et al. |
| 11,633,899 B2 | 4/2023 | Hanan et al. |
| 11,738,902 B2 | 8/2023 | Hanan |
| 11,806,917 B2 | 11/2023 | Hanan et al. |
| 2001/0000602 A1 | 5/2001 | Luch |
| 2001/0030166 A1 | 10/2001 | Ozawa et al. |
| 2002/0030031 A1 | 3/2002 | Druitt et al. |
| 2002/0037338 A1 | 3/2002 | Lisch et al. |
| 2002/0090473 A1 | 7/2002 | Lee et al. |
| 2002/0134747 A1 | 9/2002 | Babcock et al. |
| 2003/0077349 A1 | 4/2003 | Derouault et al. |
| 2003/0127418 A1 | 7/2003 | Schweigert et al. |
| 2004/0000533 A1 | 1/2004 | Kamineni et al. |
| 2004/0121038 A1 | 6/2004 | Seki et al. |
| 2005/0048235 A1 | 3/2005 | Dygert |
| 2005/0067365 A1 | 3/2005 | Hanafusa et al. |
| 2005/0150856 A1 * | 7/2005 | Ozawa ................ B65D 1/0246 215/44 |
| 2005/0175731 A1 | 8/2005 | Chiang |
| 2005/0279728 A1 | 12/2005 | Finlay et al. |

(56) References Cited

U.S. PATENT DOCUMENTS

| | | |
|---|---|---|
| 2006/0021959 A1 | 2/2006 | Falzoni |
| 2006/0065992 A1 | 3/2006 | Hutchinson et al. |
| 2006/0070977 A1 | 4/2006 | Howell et al. |
| 2006/0113274 A1 | 6/2006 | Keller et al. |
| 2006/0118508 A1 | 6/2006 | Kraft et al. |
| 2006/0131257 A1 | 6/2006 | Gatewood et al. |
| 2006/0157439 A1 | 7/2006 | Howell |
| 2006/0169666 A1 | 8/2006 | Nyman et al. |
| 2006/0255235 A1 | 11/2006 | Meyer et al. |
| 2007/0023299 A1 | 2/2007 | Clarkson |
| 2007/0131644 A1 | 6/2007 | Melrose |
| 2007/0210026 A1 | 9/2007 | Darr et al. |
| 2008/0050546 A1 | 2/2008 | Kitano et al. |
| 2008/0053949 A1 | 3/2008 | Farrar et al. |
| 2008/0073382 A1 | 3/2008 | Higgins |
| 2008/0087628 A1 | 4/2008 | Bangi et al. |
| 2008/0116162 A1 | 5/2008 | Penny |
| 2008/0197102 A1 | 8/2008 | Farrar et al. |
| 2008/0257855 A1 | 10/2008 | Patel |
| 2009/0008360 A1* | 1/2009 | Piccioli .............. B60R 19/18 215/381 |
| 2009/0020497 A1 | 1/2009 | Tanaka et al. |
| 2009/0065468 A1 | 3/2009 | Hata et al. |
| 2009/0078668 A1* | 3/2009 | Kraft .................. B65D 1/023 215/44 |
| 2009/0084751 A1 | 4/2009 | Pucci |
| 2009/0159556 A1 | 6/2009 | Patcheak et al. |
| 2009/0166314 A1 | 7/2009 | Matsuoka |
| 2009/0184082 A1 | 7/2009 | Antier et al. |
| 2009/0184127 A1 | 7/2009 | Mooney |
| 2009/0188888 A1 | 7/2009 | Penny |
| 2009/0261058 A1 | 10/2009 | Pritchett, Jr. |
| 2009/0261059 A1 | 10/2009 | Pritchett, Jr. |
| 2009/0266785 A1 | 10/2009 | Sieal |
| 2009/0283492 A1* | 11/2009 | Molinaro ............ G06F 40/44 215/256 |
| 2009/0283495 A1 | 11/2009 | Lane et al. |
| 2009/0321383 A1 | 12/2009 | Lane |
| 2010/0023378 A1 | 1/2010 | Ratnam |
| 2010/0028577 A1 | 2/2010 | Siegl |
| 2010/0089863 A1* | 4/2010 | Matsuoka ........... B65D 1/023 215/329 |
| 2010/0089865 A1 | 4/2010 | Oauchi et al. |
| 2010/0151073 A1 | 6/2010 | Daniel |
| 2010/0163513 A1 | 7/2010 | Pedmo |
| 2010/0176081 A1 | 7/2010 | Kamineni et al. |
| 2010/0178148 A1 | 7/2010 | Forsthoevel et al. |
| 2010/0206837 A1 | 8/2010 | Deemer et al. |
| 2010/0206838 A1 | 8/2010 | Mast et al. |
| 2010/0206839 A1 | 8/2010 | Tanaka et al. |
| 2010/0206892 A1 | 8/2010 | Mast |
| 2010/0213204 A1 | 8/2010 | Melrose |
| 2010/0252583 A1 | 10/2010 | Maas et al. |
| 2010/0270256 A1* | 10/2010 | Penny ................. B29C 49/48 215/44 |
| 2010/0270259 A1 | 10/2010 | Russell et al. |
| 2010/0286837 A1 | 11/2010 | Jiao et al. |
| 2010/0304168 A1 | 12/2010 | Dambach |
| 2010/0304169 A1 | 12/2010 | Dambach |
| 2010/0308054 A1 | 12/2010 | Goria et al. |
| 2010/0314348 A1 | 12/2010 | Zoppas et al. |
| 2010/0320218 A1 | 12/2010 | Tanaka |
| 2011/0008560 A1 | 1/2011 | Dabbous et al. |
| 2011/0017700 A1 | 1/2011 | Patcheak et al. |
| 2011/0024423 A1 | 2/2011 | Erspamer et al. |
| 2011/0073559 A1 | 3/2011 | Schlies et al. |
| 2011/0115135 A1 | 5/2011 | Siegl |
| 2011/0278313 A1* | 11/2011 | Labadie ............. B65D 1/0246 220/669 |
| 2012/0027966 A1 | 2/2012 | Siegl |
| 2012/0031870 A1 | 2/2012 | Porter et al. |
| 2012/0091091 A1 | 4/2012 | Steinberger |
| 2012/0091134 A1 | 4/2012 | Sadiq et al. |
| 2012/0248003 A1 | 10/2012 | Hunter et al. |
| 2012/0263902 A1 | 10/2012 | Hanan |
| 2012/0305516 A1 | 12/2012 | Kuzma et al. |
| 2012/0328804 A1 | 12/2012 | Allen et al. |
| 2013/0113143 A1 | 5/2013 | Favre et al. |
| 2013/0147097 A1 | 6/2013 | Lane et al. |
| 2014/0076838 A1 | 3/2014 | Siegi |
| 2014/0157726 A1 | 6/2014 | Clusserath et al. |
| 2014/0190927 A1 | 7/2014 | Lane |
| 2014/0314984 A1 | 10/2014 | Lehner et al. |
| 2014/0346135 A1 | 11/2014 | Melrose |
| 2015/0027974 A1* | 1/2015 | Niec .................. B65D 1/0207 215/44 |
| 2015/0122766 A1 | 5/2015 | Hanan |
| 2015/0144587 A1 | 5/2015 | Hanan |
| 2015/0190975 A1 | 7/2015 | Yokobayashi et al. |
| 2015/0191269 A1 | 7/2015 | Siegl |
| 2015/0202818 A1* | 7/2015 | Marin ................ B65D 1/0207 264/537 |
| 2016/0001913 A1* | 1/2016 | Koenig ................. B29C 49/70 264/523 |
| 2016/0137331 A1 | 5/2016 | Hanan |
| 2016/0176566 A1 | 6/2016 | Hanan |
| 2016/0193750 A1 | 7/2016 | Gaiotti et al. |
| 2016/0257029 A1 | 9/2016 | Lane et al. |
| 2017/0210503 A1* | 7/2017 | de Cleir ............... B65D 1/023 |
| 2017/0217646 A1 | 8/2017 | Hanan |
| 2018/0043603 A1 | 2/2018 | Smith et al. |
| 2018/0044072 A1 | 2/2018 | Asakawa et al. |
| 2018/0133948 A1 | 5/2018 | Suyama et al. |
| 2018/0229881 A1 | 8/2018 | Jarman et al. |
| 2018/0297752 A1 | 10/2018 | Mai |
| 2018/0327131 A1 | 11/2018 | Hanan |
| 2018/0327132 A1 | 11/2018 | Hanan |
| 2018/0339843 A1 | 11/2018 | Cassoni et al. |
| 2019/0263554 A1 | 5/2019 | Hanan |
| 2019/0248060 A1 | 8/2019 | Okuyama |
| 2019/0367203 A1 | 12/2019 | Okuyama et al. |
| 2019/0375556 A1 | 12/2019 | Hanan |
| 2020/0031530 A1 | 1/2020 | Hanan |
| 2020/0031531 A1 | 1/2020 | Hanan |
| 2020/0071035 A1 | 3/2020 | Hanan |
| 2020/0095007 A1 | 3/2020 | Jarman et al. |
| 2020/0198855 A1 | 6/2020 | Sterling et al. |
| 2020/0216213 A1 | 7/2020 | Hanan |
| 2020/0255179 A1 | 8/2020 | Hanan |
| 2020/0269484 A1 | 8/2020 | Hanan |
| 2020/0298461 A1 | 9/2020 | Hanan et al. |
| 2020/0298462 A1 | 9/2020 | Hanan |
| 2022/0041339 A1 | 2/2022 | Hanan |
| 2022/0288834 A1 | 9/2022 | Bruinooge et al. |
| 2022/0097895 A1 | 10/2022 | Hanan |
| 2023/0059994 A1 | 2/2023 | Graux |
| 2023/0182949 A1 | 6/2023 | Hanan |
| 2023/0256662 A1 | 8/2023 | Hanan et al. |
| 2024/0075674 A1 | 3/2024 | Hanan et al. |

FOREIGN PATENT DOCUMENTS

| | | |
|---|---|---|
| CN | 106542191 A | 3/2017 |
| DE | 102012001229 A1 | 7/2013 |
| EP | 0199576 A2 | 10/1986 |
| EP | 1405710 B1 | 5/2008 |
| EP | 2687450 A1 | 1/2014 |
| FR | 2846946 B1 | 3/2005 |
| FR | 2899204 B1 | 6/2008 |
| JP | S5486560 A | 7/1979 |
| JP | S6251423 A | 3/1987 |
| JP | H072263 A | 1/1995 |
| JP | H07149357 A | 6/1995 |
| JP | H07164436 A | 6/1995 |
| JP | H0848321 A | 2/1996 |
| JP | H09240647 A | 9/1997 |
| JP | H1029614 A | 2/1998 |
| JP | 2004090425 A | 3/2004 |
| JP | 2006232392 A | 9/2006 |
| JP | 2008189721 A | 8/2008 |
| JP | 2009045877 A | 3/2009 |
| JP | 2010285162 A | 12/2010 |
| JP | 2015182789 A | 10/2015 |

(56) References Cited

FOREIGN PATENT DOCUMENTS

| WO | 199728057 A1 | 8/1997 |
| WO | WO2004080828 A1 | 9/2004 |
| WO | WO2005073096 A1 | 11/2005 |
| WO | WO2006005413 A1 | 1/2006 |
| WO | WO2006027092 A1 | 3/2006 |
| WO | WO2007033722 A1 | 3/2007 |
| WO | WO2007124894 A1 | 11/2007 |
| WO | WO2009122144 A1 | 10/2009 |
| WO | WO2010113079 A2 | 10/2010 |
| WO | WO2011160748 A1 | 12/2011 |
| WO | WO2012095285 A1 | 7/2012 |
| WO | WO2012156048 A1 | 11/2012 |
| WO | WO2015032897 A1 | 3/2015 |
| WO | WO2015189436 A1 | 12/2015 |
| WO | 2016103563 A1 | 6/2016 |
| WO | WO2017136584 A1 | 8/2017 |
| WO | WO2017183952 A1 | 10/2017 |
| WO | 2020245250 A1 | 12/2020 |
| WO | 2021005505 A1 | 1/2021 |

OTHER PUBLICATIONS

European Patent Office Extended Search Report for Related Application No. 20774670.2 dated Oct. 21, 2022 (11 pages).
International Search Report and Written Opinion for Application No. PCT/US2020/012147 dated Apr. 6, 2020 (7 pages).
European Patent Office Extended Search Report for Related Application No. 24165660.2 dated Aug. 21, 2024 (7 pages).
Australian Patent Office. Examination Report No. 1 for Application No. 2019312561, dated May 27, 2024 (3 pages).
Mexican Patent Office. Office Action for Application No. MX/a/2021/001286, dated May 7, 2024 (12 pages with machine translation).
European Patent Office Extended European Search Report for Related Application No. 24172208.1 dated Oct. 17, 2024 (20 pages).

* cited by examiner

CONTAINER PREFORM WITH THREADED TAMPER EVIDENCE FINISH

PRIORITY

This application claims the benefit of and priority to U.S. Provisional Application, entitled "Container Preform With Threaded Tamper Evidence Finish," filed Jul. 30, 2018 and having application Ser. No. 62/712,115, the entirety of said application being incorporated herein by reference.

FIELD

Embodiments of the present disclosure generally relate to the field of preforms for plastic containers. More specifically, embodiments of the disclosure relate to preforms and plastic bottles blown from such preforms that are suitable for containing beverages.

BACKGROUND

Plastic containers have been used as a replacement for glass or metal containers in the packaging of beverages for several decades. The most common plastic used in making beverage containers today is polyethylene terephthalate (PET). Containers made of PET are transparent, thin walled, and have the ability to maintain their shape by withstanding the force exerted on the walls of the container by their contents. PET resins are also reasonably priced and easy to process. PET bottles are generally made by a process that includes the blow-molding of plastic preforms which have been made by injection molding of the PET resin.

Advantages of plastic packaging include lighter weight and decreased breakage as compared to glass, and lower costs overall when taking both production and transportation into account. Although plastic packaging is lighter in weight than glass, there is still great interest in creating the lightest possible plastic packaging so as to maximize the cost savings in both transportation and manufacturing by making and using containers that contain less plastic.

SUMMARY

Container preforms with threaded tamper evidence finishes in accordance with embodiments of the invention are disclosed. In one embodiment, a preform suitable for being blow-molded to form a container, the preform includes a finish portion including an opening to an interior of the preform and a tamper evidence ledge, a neck portion adjacent to the tamper evidence ledge, a tapered portion configured to transition from a diameter of the neck portion to a smaller diameter of a cylindrical portion including an elongate member that culminates in an end cap, and one or more threads disposed on the finish portion and configured to threadably receive a cap.

In a further embodiment, a handling valley is disposed between the tamper evidence ledge and the one or more threads, the handing valley extending circumferentially around the finish portion.

In another embodiment, the handling valley includes a portion of the finish portion that has a wall thickness and a diameter that are substantially similar to the wall thickness and diameter of the neck portion.

In a still further embodiment, the handling valley and the neck portion enable gripping fingers to engage with and support the container during air-conveying the container along a manufacturing assembly.

In still another embodiment, the tamper evidence ledge includes a rounded upper portion and a substantially flat lower portion.

In a yet further embodiment, the rounded upper portion facilitates passing a tamper-evident ring portion of the cap over the tamper evidence ledge during assembly of the cap onto the container, and the flat lower portion is configured to retain the tamper-evident ring positioned below the tamper evidence ledge during loosening of the cap, causing the tamper-evident ring to break loose from the cap.

In a further embodiment again, the flat lower portion and the tamper-evident ring cooperate to indicate that the cap has not been previously loosened after being installed by the manufacturer.

In another embodiment again, the tapered portion includes a wall thickness that smoothly transitions from a wall thickness of the neck portion to a greater wall thickness of the cylindrical portion, the wall thickness of the tapered portion and the wall thickness of the cylindrical portion being suitable for being blow-molded into a predetermined shape and size of the container.

In a further additional embodiment, the one or more threads are configured to rotatably engage with threads disposed within the cap.

In another additional embodiment, the one or more threads each extends along a section of the circumference of the finish portion.

In a still yet further embodiment, the one or more threads are spaced uniformly around the circumference of the finish portion.

In still yet another embodiment, the one or more threads share an adjacent intervening valley configured to allow passage of a thread disposed in the cap.

In a still further embodiment again, the finish portion includes a bevel disposed at a beginning of the opening and configured to enter into sliding contact with a sealing flange of the cap.

In still another embodiment again, the bevel is configured to compress the sealing flange to a predetermined degree so as to form a tight seal suitable to retain pressurized contents within the container.

A variety of embodiments include preforms suitable for being blow-molded to form a container, the preforms include a finish portion including an opening to an interior of the preform and including a tamper evidence ledge, a body portion including a tapered portion that smoothly transitions from a neck portion to a cylindrical portion and an end cap, the neck portion being adjacent to the tamper evidence ledge, one or more threads disposed on the finish portion and configured to threadably receive a cap, a handling valley disposed between the one or more threads and the tamper evidence ledge, and a bevel disposed at a beginning of the opening and configured to receive a sealing flange of the cap.

In a yet further embodiment again, the tapered portion includes a smooth transition from a diameter and a wall thickness of the neck portion to a relatively smaller diameter and a greater wall thickness of the cylindrical portion.

In a further additional embodiment again, the wall thickness of the body portion is suitable for being blow-molded into a desired shape and size of the container.

In a still yet further additional embodiment, the tamper evidence ledge is configured to cooperate with a tamper-evident ring portion of the cap to indicate that the cap has not been previously loosened after being installed by the manufacturer.

In yet another additional embodiment again, the handling valley includes a portion of the finish portion that has a wall thickness and a diameter that are substantially similar to the wall thickness and diameter of the neck portion.

In another further embodiment, the handling valley and the neck portion enable gripping fingers to engage with and support the container during air-conveying the container along a manufacturing assembly.

In yet another further embodiment, the handling valley provides a separation between the tamper evidence ledge and the one or more threads suitable for receiving a pair of gripping fingers of air conveyor system.

Although the description above contains many specificities, these should not be construed as limiting the scope of the invention but as merely providing illustrations of some of the presently preferred embodiments of the invention. Various other embodiments are possible within its scope. Accordingly, the scope of the invention should be determined not by the embodiments illustrated, but by the appended claims and their equivalents.

BRIEF DESCRIPTION OF THE DRAWINGS

The drawings refer to embodiments of the present disclosure in which.

Figure 1:
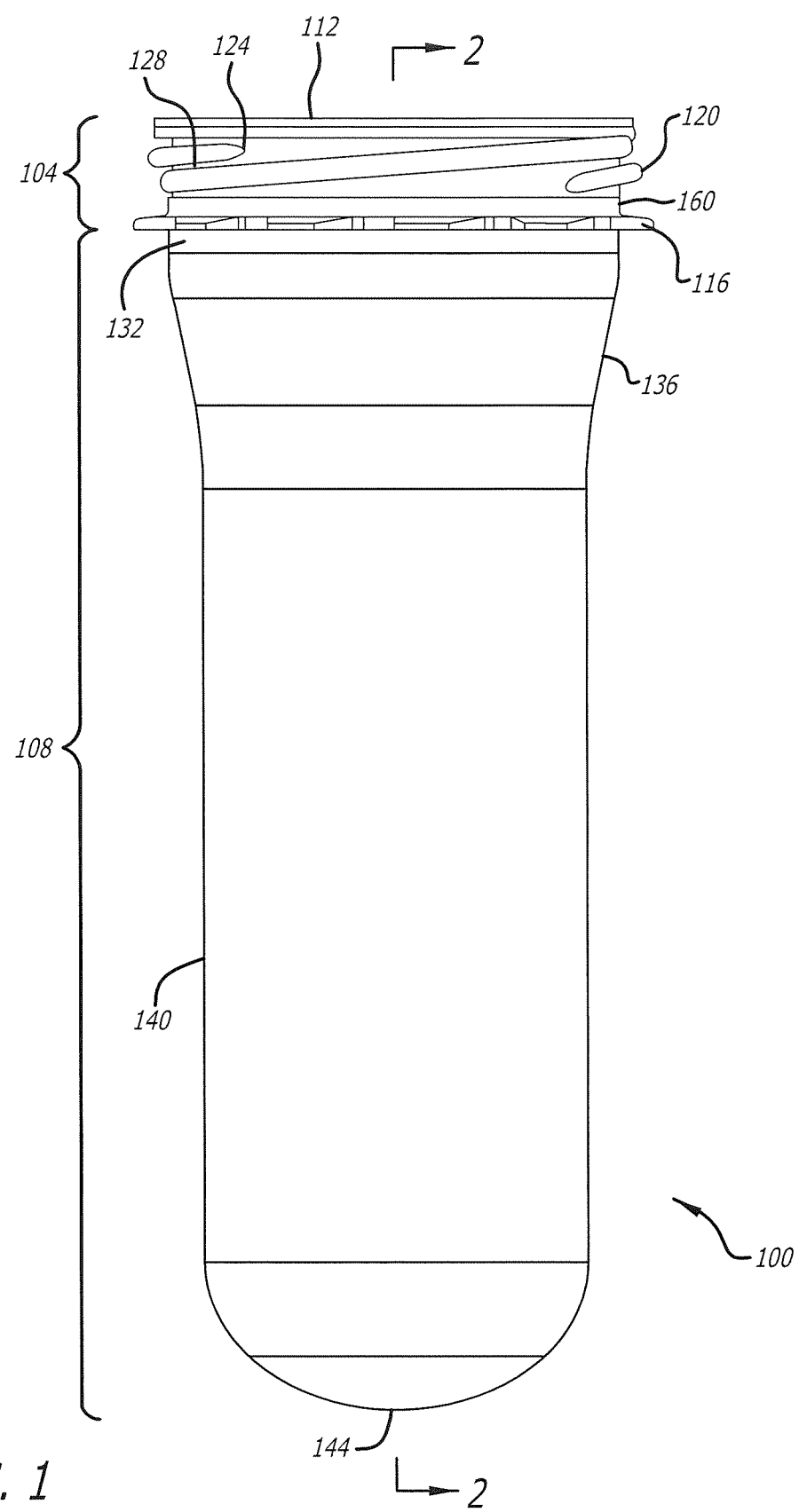
FIG. 1 illustrates a side plan view of an exemplary embodiment of a preform suitable for being blow-molded to form a container in accordance with the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first preform," may be made. However, the specific numeric reference should not be interpreted as a literal sequential order but rather interpreted that the "first preform" is different than a "second preform." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Disclosed herein are articles, including preforms and containers, which utilize less plastic in their construction while maintaining the ease of processing and excellent structural properties associated with current commercial designs.

FIG. 1 illustrates an exemplary embodiment of a preform 100 suitable for being blow-molded to form a container, or a plastic bottle, according to the present disclosure. The preform 100 preferably is made of material approved for contact with food and beverages such as virgin PET and can be of any of a wide variety of shapes and sizes. The preform 100 shown in FIG. 1 is of the type which will form a 12-16 oz. beverage bottle, but as will be understood by those skilled in the art, other preform configurations may be used depending upon the desired configuration, characteristics and use of the final article. The preform 100 may be made by injection molding methods, without limitation.

Figure 2:
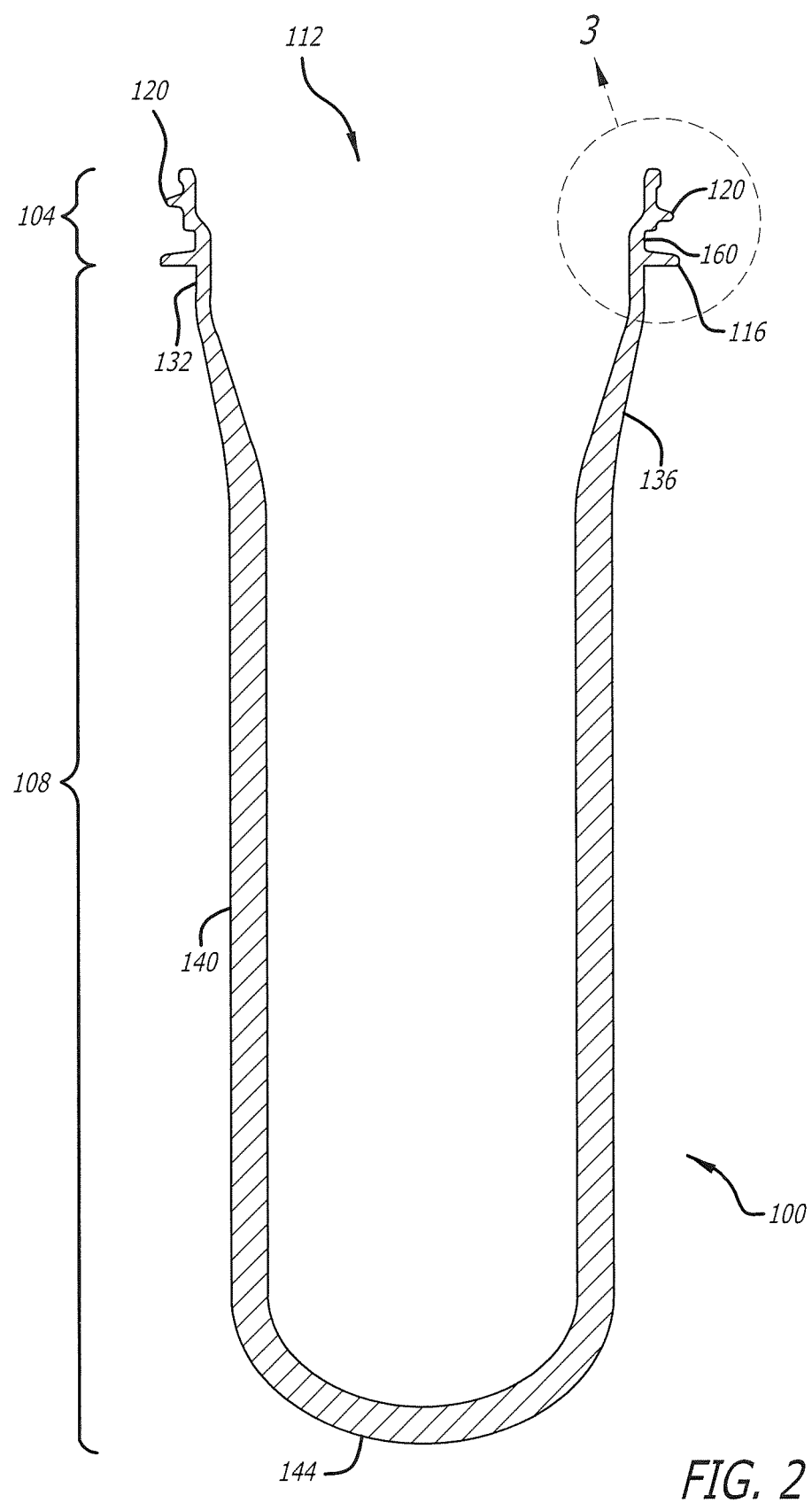
FIG. 2 illustrates a cross-sectional slice view of the preform illustrated in FIG. 1, taken along a line 2-2, according to the present disclosure.

FIG. 2 illustrates a cross-sectional slice view of the preform 100 illustrated in FIG. 1, taken along a line 2-2. The preform 100 includes a finish portion 104 and a body portion 108, formed monolithically (i.e., as a single, or unitary, structure). Advantageously, the monolithic arrangement of the preform 100, when blow-molded into a bottle, provides greater dimensional stability and improved physical properties in comparison to a preform constructed of separate neck and body portions that are bonded together.

The finish portion 104 begins at an opening 112 to an interior of the preform 100 and extends to and includes a tamper evidence ledge 116. The finish portion 104 is further characterized by the presence of one or more threads 120 configured to provide a means to fasten a closure, such as a cap, to the bottle produced from the preform 100. As such, the plurality of threads 120 are configured to rotatably engage with similar threads disposed within the cap to provide a way to seal contents within the bottle. In the embodiment illustrated in FIG. 1, each of the plurality of threads 120 generally extends along a section of the circumference of the finish portion 104 and approaches the tamper evidence ledge 116. Thus, when the threads of a cap are engaged with the threads 120, and the cap is rotated in a clockwise direction, the cap advances toward the tamper evidence ledge 116.

As best shown in FIG. 1, each of the one or more threads 120 begins at a thread start 124 and extends along an angular section of the finish portion 104. The thread start 124 is configured to guide the thread 120 into a space, or valley 128, between adjacent threads of the cap so as to threadably engage the cap with the finish portion 104. Further, the threads 120 generally are disposed adjacently to one another and are spaced uniformly around the circumference of the finish portion 104. In some embodiments, wherein three threads 120 are disposed around the finish portion 104, the thread starts 124 of adjacent threads 120 are spaced at substantially 120-degree intervals around the perimeter of the finish portion 104. As will be appreciated, however, more or less than three threads 120 may be incorporated into the finish portion 104 without deviating beyond the scope of the present disclosure.

The body portion 108 includes a neck portion 132 that extends to a tapered portion 136 of the body portion 108.

The tapered portion 136 comprises a smooth transition from a diameter of the neck portion 132 to a relatively smaller diameter of a cylindrical portion 140 of the preform 100. The cylindrical portion 140 is a generally elongate member that culminates in an end cap 144. In some embodiments the body portion 108 may be generally cylindrical, and the end cap 144 may be conical or frustoconical and may also be hemispherical, and the very terminus of the end cap 144 may be flattened or rounded.

As best shown in FIG. 2, a wall thickness of the cylindrical portion 140 is substantially uniform throughout the cylindrical portion 140 and the end cap 144. A wall thickness of the tapered portion 136, however, generally decreases from the wall thickness of the cylindrical portion 140 to a relatively thinner wall thickness of the neck portion 132. As will be appreciated, the wall thickness of the cylindrical portion 140 is relatively greater than the wall thickness of the neck portion 132 so as to provide a wall thickness at the desired dimensions of a finished product after the preform 100 is blow-molded into the shape and size of a bottle. As such, the wall thickness throughout most of the body portion 108 will depend upon the overall size of the preform 100 and the wall thickness and overall size of the resulting container.

Figure 3:
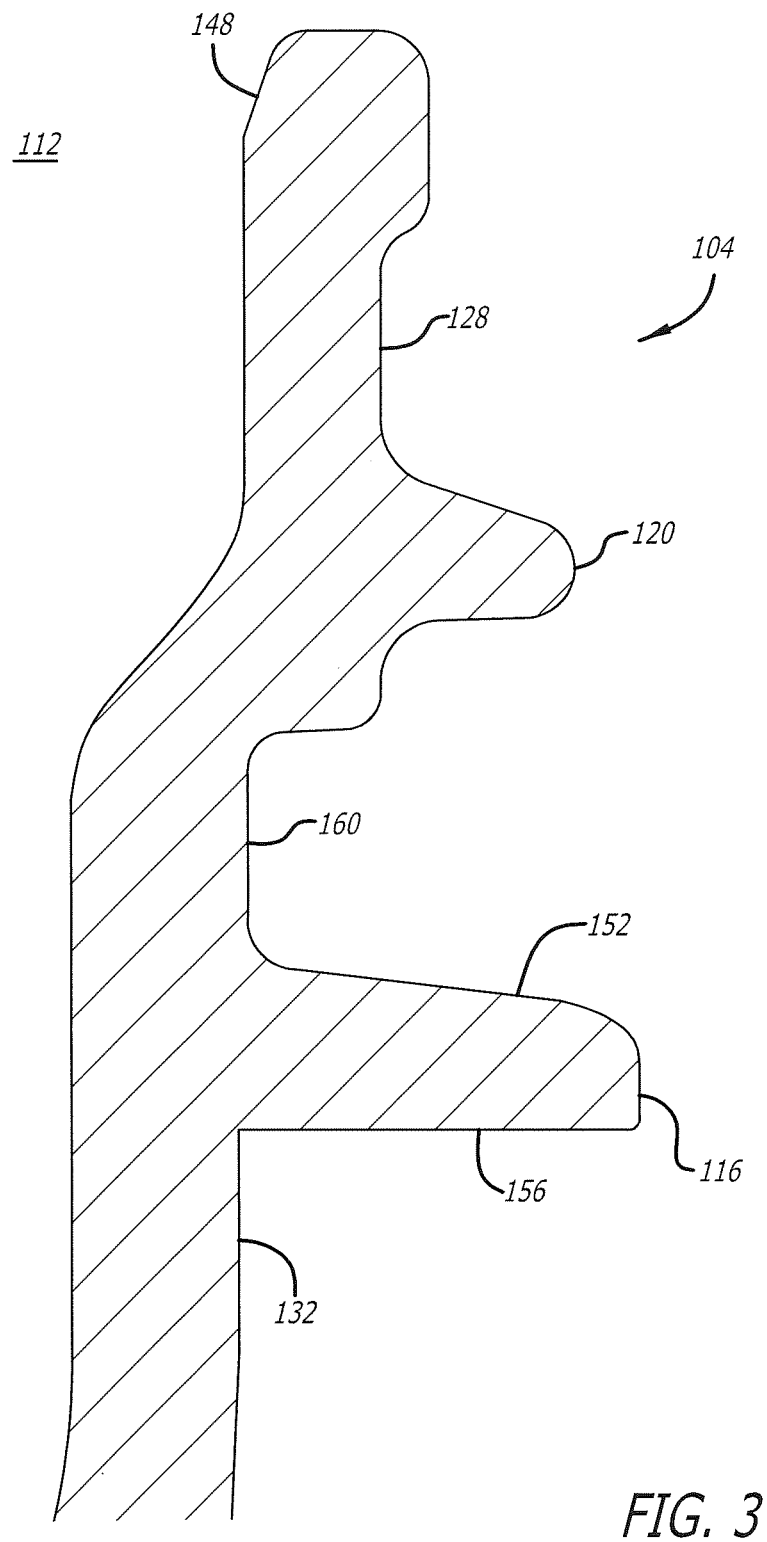
FIG. 3 illustrates a close-up cross-sectional view of a finish comprising the preform illustrated in FIG. 1, according to the present disclosure.

FIG. 3 illustrates a close-up cross-sectional view of the finish portion 104 comprising the preform 100 illustrated in FIG. 1, according to the present disclosure. The finish portion 104 shown in FIG. 3 can be understood to wrap around the entirety of the preform circumference. In many embodiments, the cross section of the finish portion 104 will vary in regards to the placement of the plurality of threads 120, but will remain constant for the remainder of elements. As described hereinabove, the finish portion 104 includes one or more threads 120 extending along sections of the circumference of the finish portion 104 and approaching the tamper evidence ledge 116. The threads 120 generally extend outward from the finish portion 104 such that a valley 128 is disposed between adjacent threads. The cross-sectional profile of the threads 120 is configured such that the threads advantageously engage with similar threads disposed within the cap for sealing contents within the container formed by blow-molding the preform 100. As will be recognized by those skilled in the art, the valley 128 is configured to allow passage of a thread disposed in the cap to pass between adjacent threads 120 during tightening of the cap onto the finish portion 104.

With continuing reference to FIG. 3, the finish portion 104 includes a bevel 148 disposed at the beginning of the opening 112. The bevel 148 is typically configured to enter into sliding contact with a sealing flange of a suitable cap so as to prevent contents from leaking out of the container formed from the preform 100. In some embodiments, the bevel 148 may compress the sealing flange to a predetermined degree, thereby forming a tight seal suitable to retain pressurized contents within the container.

As further shown in FIG. 3, the tamper evidence ledge 116 comprises a rounded upper portion 152 and a substantially flat lower portion 156. As will be appreciated, the rounded upper portion 152 facilitates passing a tamper-evident ring portion of the cap over the tamper evidence ledge 116 during assembly of the cap onto the container. The flat lower portion 156 is configured to retain the tamper-evident ring positioned below the tamper evidence ledge 116 during loosening of the cap. For example, when the cap is initially installed onto the container by a manufacturer, the tamper-evident ring can easily pass over the tamper evidence ledge 116 due to the rounded upper portion 152. When an end-user later loosens the cap, the flat lower portion 156 generally retains the tamper-evident ring below the tamper evidence ledge 116, often causing the tamper-evident ring to break loose from the cap. Thus, the flat lower portion 156 of the tamper evidence ledge 116 and the tamper-evident ring of the cap can cooperate to indicate to the end-user that the cap has not been previously loosened after being installed by the manufacturer. It should be understood, however, that the tamper evidence ledge 116 is not limited to being coupled with tamper-evident rings, as described above, but rather the tamper evidence ledge 116 may be configured to operate with any variety of devices for potentially indicating whether or not the container has been previously opened.

Disposed between the tamper evidence ledge 116 and the threads 120 is a handling valley 160 that extends circumferentially around the finish portion 104. Further, the handling valley 160 comprises a portion of the finish 104 that has a wall thickness and a diameter that are substantially similar to the wall thickness and diameter of the neck portion 132, below the tamper evidence ledge 116. As such, the handling valley 160 and the neck portion 132 advantageously enable gripping fingers or other suitable engagement methods to engage with and support the container during air-conveying the container along a manufacturing assembly. For example, a first pair of gripping fingers can extend into the handling valley 160 to support the container at a first station of a manufacturing line. Then, upon being conveyed to a second station, a second pair of gripping fingers can extend around the neck portion 132, below the tamper evidence ledge 116, while the first pair of gripping fingers are removed from the handling valley 160. Similarly, upon arriving at a third station, a third pair of gripping fingers can engage with the handling valley 160 while the second pair of gripping fingers are removed from the neck portion 132. Thus, the container can be transported along the manufacturing line by alternatingly engaging gripping fingers with the handling valley 160 and the neck portion 132. The method of passing off preforms via an alternating method described above is advantageous as a preform may be exposed to numerous processes within numerous machines during the process of forming a final bottle shape. This allows the manufacturer to have more flexibility when designing and implementing various manufacturing methods and setups.

As will be appreciated, the handling valley 160 provides a separation between the tamper evidence ledge 116 and the threads 120 suitable for receiving the pair of gripping fingers, as described above. In general, the separation must be large enough to allow the gripping fingers to easily pass between the tamper evidence ledge 116 and the threads 120. As such, any of various separations, greater than the width of the gripping fingers, may be disposed between the tamper evidence ledge 116 and the threads 120, without limitation and without deviating beyond the scope of the present disclosure. By way of example and not limitation, the gripping fingers may be designed to have a height similar to the height of the tamper evidence ledge 116 (measured between the points where the rounded upper portion 152 and the flat lower portion 156 meet the finish body). As can be understood, the manufacturing of gripping fingers with smaller overall heights can allow for a reduction in the size of the handling valley 160 and thus the overall amount of plastic required in the preform 100.

Figure 4:
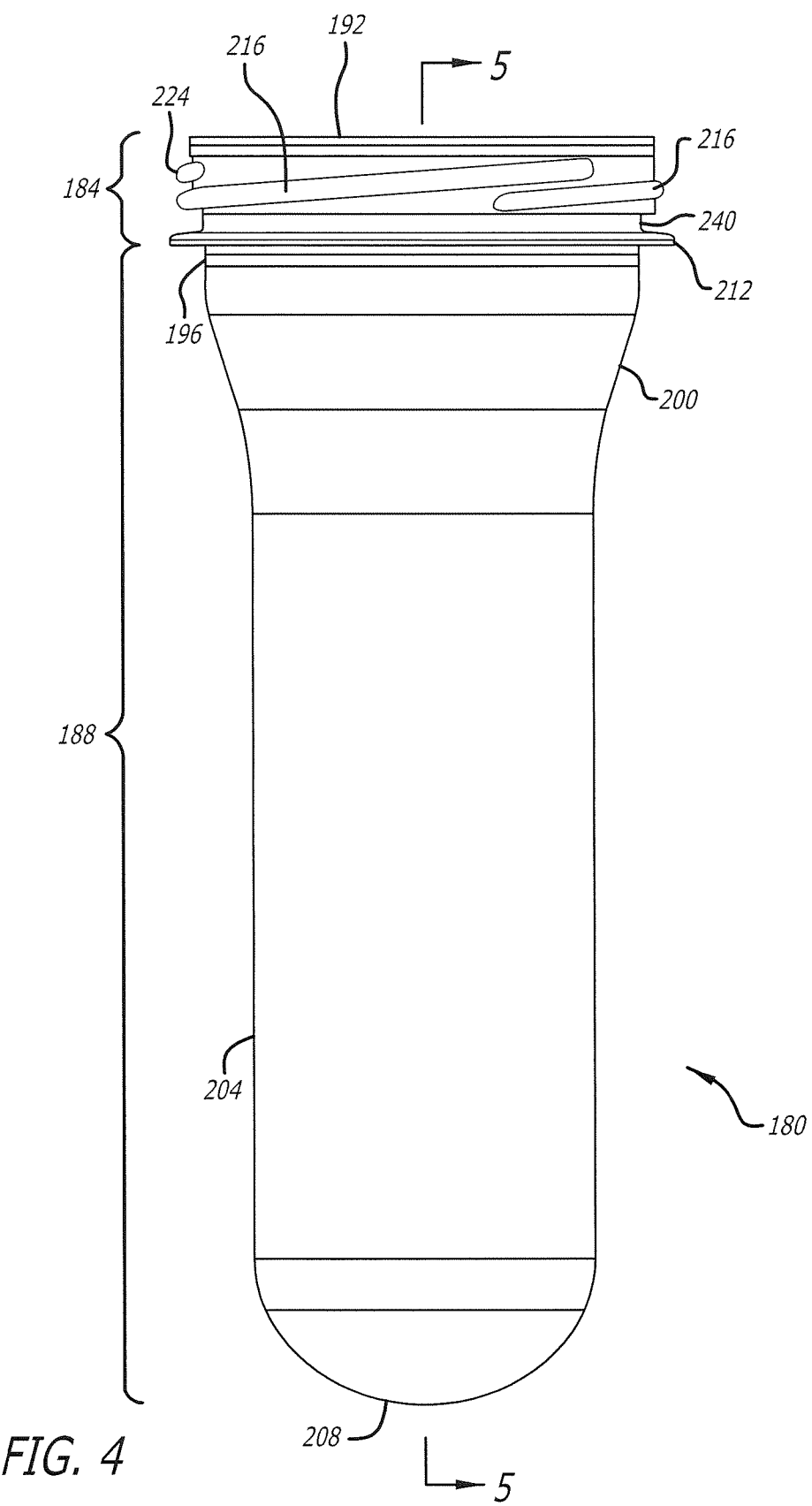
FIG. 4 illustrates a side plan view of an exemplary embodiment of a preform suitable for being blow-molded to form a container in accordance with the present disclosure.
Figure 5:
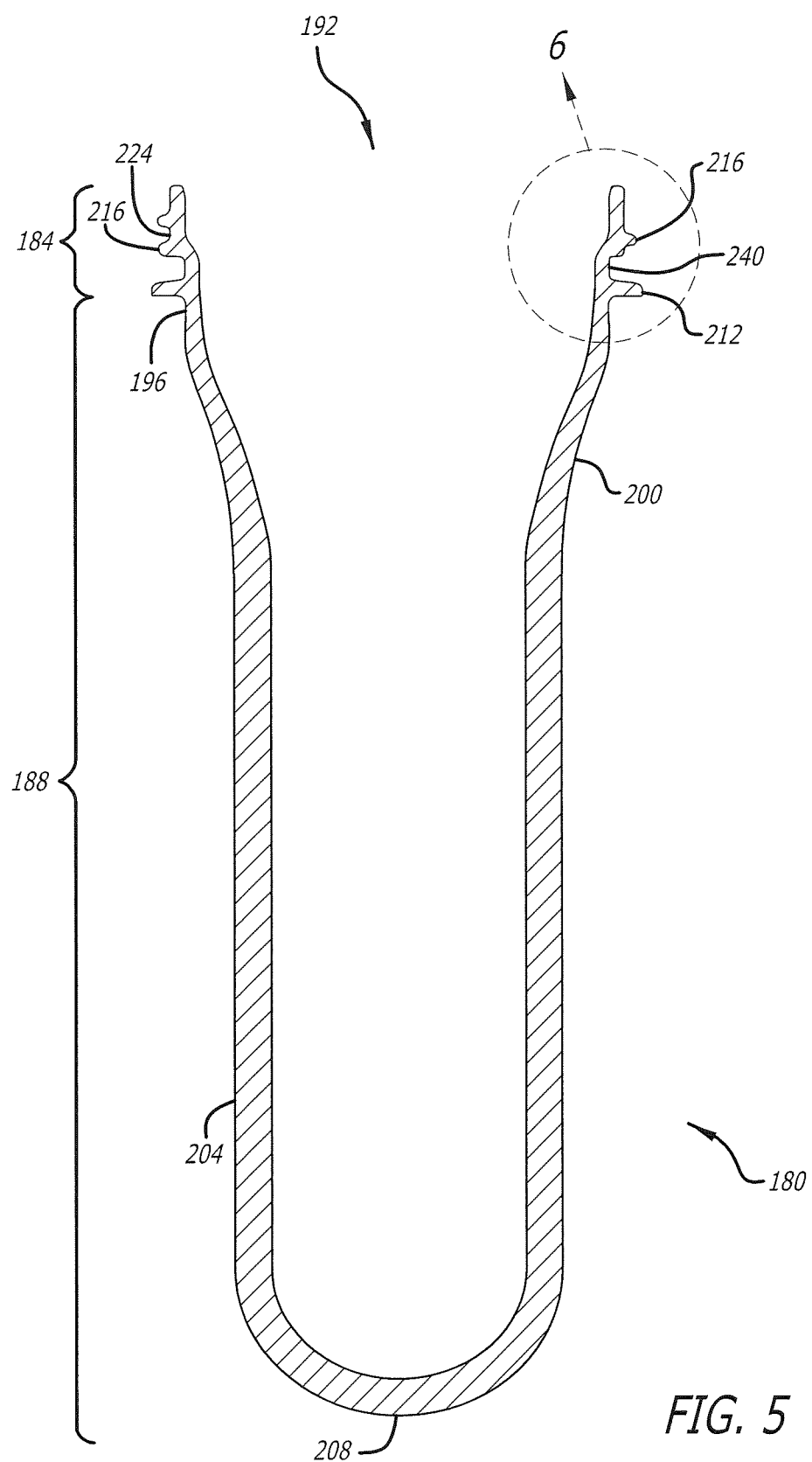
FIG. 5 illustrates a cross-sectional slice view of the preform illustrated in FIG. 4, taken along a line 5-5, according to the present disclosure.
Figure 6:
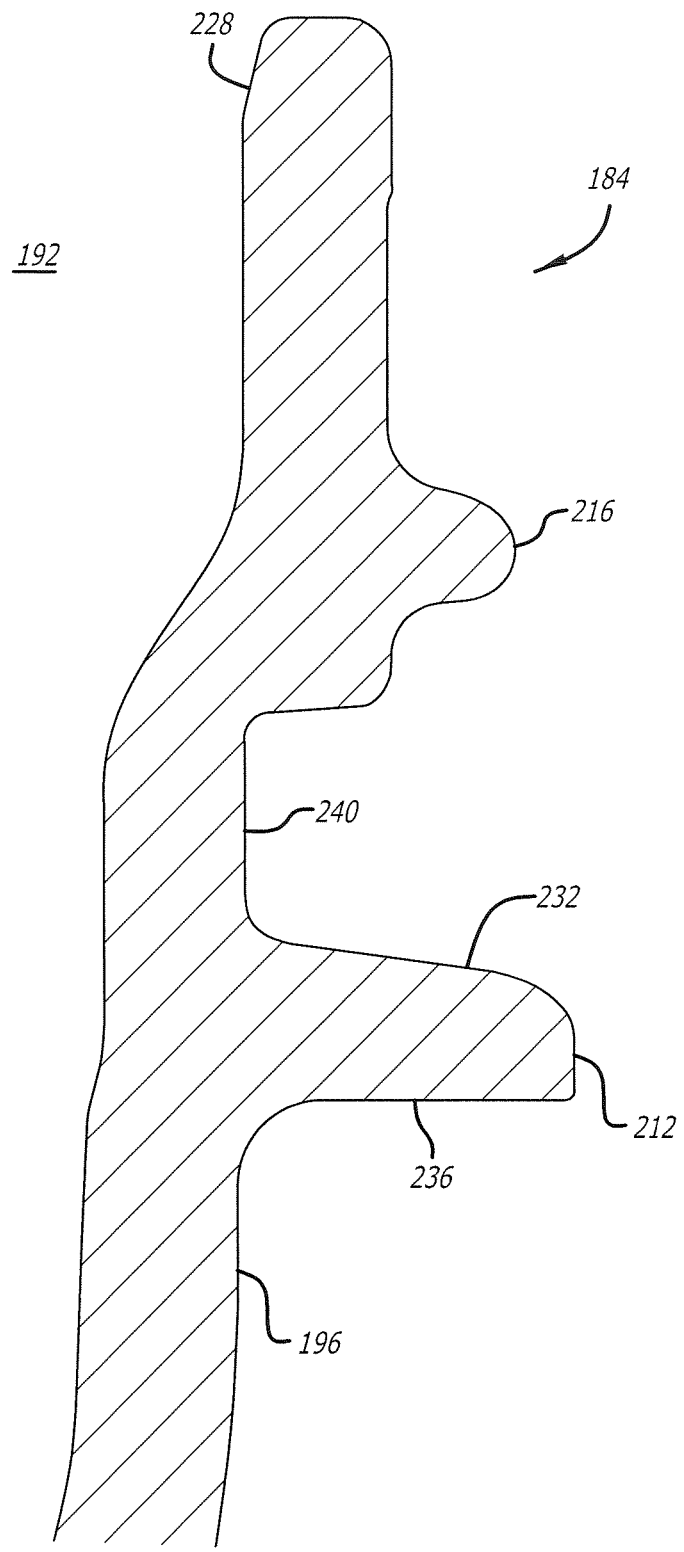
FIG. 6 illustrates a close-up cross-sectional view of a finish comprising the preform illustrated in FIG. 4, according to the present disclosure.

FIGS. 4-6 illustrate an exemplary embodiment of a preform 180 suitable for being blow-molded to form a container, or a plastic bottle, in accordance with the present disclosure. Similar to the preforms 100 described in FIGS. 1-3, the preform 180 comprises a finish portion 184 and a body portion 188 that are typically monolithically formed. In this embodiment, the finish portion 184 can begin at an opening 192 to an interior of the preform 180 and extends to a neck portion 196 of the body portion 188. The neck portion 196 extends to a tapered portion 200 comprising a smooth transition from a diameter of the neck portion 196 to a relatively smaller diameter of a cylindrical portion 204 of the preform 180. In many embodiments, the cylindrical portion 204 is a generally elongate member that extends to an end cap 208.

As best shown in FIG. 5, a wall thickness of the cylindrical portion 204 is substantially uniform throughout the cylindrical portion and the end cap 208. A wall thickness of the tapered portion 196, however, generally decreases from the wall thickness of the cylindrical portion 204 to a relatively thinner wall thickness of the neck portion 196. As discussed herein, the wall thickness of the cylindrical portion 204 is relatively greater than the wall thickness of the neck portion 196 so as to provide a wall thickness at the desired dimensions of a finished product after being blow-molded into the shape and size of a bottle or container.

The finish portion 184 begins at the opening 192 to the interior of the preform 180 and extends to and includes a tamper evidence ledge 212. The finish portion 184 includes one or more threads 216 configured to rotatably engage with similar threads disposed within a closure or cap to provide a way to seal contents within the bottle. As shown in FIG. 4, the threads 216 extend along sections of the circumference of the finish portion 184 and approach the tamper evidence ledge 212, such that when the threads of the cap are engaged with the threads 216, and the cap is rotated clockwise, the cap advances toward the tamper evidence ledge 212.

Similar to the threads 120, discussed with respect to FIG. 1, each of the threads 216 begins at a thread start 220 and extends along an angular section of the finish portion 184. The thread start 220 is configured to guide the thread 216 into a space between adjacent threads of the cap so as to threadably engage the cap with the finish portion 184. Further, the threads 216 generally are disposed adjacently to one another and are spaced uniformly around the circumference of the finish portion 184. It should be understood that any number of threads 216 may be incorporated into the finish portion 184 without deviating beyond the scope of the present disclosure.

As mentioned hereinabove, the body portion 188 includes the neck portion 196 extending to the tapered portion 200 of the body portion 188. The tapered portion 200 smoothly transitions from a diameter of the neck portion 196 to a relatively smaller diameter of the cylindrical portion 204 of the preform 180. The cylindrical portion 204 is a generally elongate member that culminates in the end cap 208. In some embodiments the body portion 188 may be generally cylindrical, and the end cap 208 may be conical or frustoconical and may also be hemispherical, and the very terminus of the end cap 208 may be flattened or rounded.

With reference to FIG. 5, a wall thickness of the cylindrical portion 204 can be substantially uniform throughout the cylindrical portion 204 and the end cap 208 in many embodiments. A wall thickness of the tapered portion 200 typically decreases from the wall thickness of the cylindrical portion 204 to a relatively thinner wall thickness of the neck portion 196. As such, the wall thickness of the cylindrical portion 204 is relatively greater than the wall thickness of the neck portion 196 so as to provide a wall thickness at the desired dimensions of a finished product after the preform 180 is blow-molded into the shape and size of a bottle. To this end, the wall thickness throughout most of the body portion 188 depends upon the overall size of the preform 180, as well as the desired wall thickness and overall size of the resulting container.

Turning, now, to FIG. 6, a close-up cross-sectional view of the finish portion 184 comprising the preform 180 is shown. The finish portion 184 can often be substantially similar to the finish portion 104, described with respect to FIG. 3. The finish portion 184 includes one or more threads 216 extending along sections of the circumference of the finish portion 184 and approaching the tamper evidence ledge 212. The threads 216 generally extend outward from the finish portion 184 such that a valley 224 can be disposed between adjacent threads when the cross section contains multiple threads. As will be appreciated, the valley 224 allows passage of a thread disposed in the cap to pass between adjacent threads 216 during tightening of the cap onto the finish portion 184.

With continuing reference to FIG. 6, the finish portion 184 can often include a bevel 228 disposed at the beginning of the opening 192. The bevel 228 is configured to enter into sliding contact with a sealing flange of a suitable cap so as to prevent contents from leaking out of the container formed from the preform 180. As mentioned herein, the bevel 228 may, in some embodiments, compress the sealing flange to a predetermined degree, thereby forming a tight seal suitable to retain pressurized contents within the container.

The tamper evidence ledge 212 shown in FIG. 6 can be substantially similar to the tamper evidence ledge 116 discussed in connection with FIG. 3. The tamper evidence ledge 212 comprises a rounded upper portion 232 and a substantially flat lower portion 236. The rounded upper portion 232 allows a tamper-evident ring portion of a cap to easily pass over the tamper evidence ledge 212 during assembly of the cap onto the container. The flat lower portion 236 retains the tamper-evident ring positioned below the tamper evidence ledge 212 during loosening of the cap, causing the tamper-evident ring to break loose from the cap. In this way, the flat lower portion 236 of the tamper evidence ledge 212 and the tamper-evident ring of the cap may cooperate in such a way as to indicate to the end-user that the cap has not been previously loosened after being installed by the manufacturer. As discussed hereinabove, however, the tamper evidence ledge 212 is not limited to being coupled with tamper-evident rings, but rather the tamper evidence ledge 212 may be configured to operate with any of various devices for indicating whether or not the container has been previously opened.

With continuing reference to FIG. 6, a handling valley 240 is disposed between the tamper evidence ledge 212 and the threads 216. The handling valley 240 extends circumferentially around the finish portion 184 and is configured to receive a pair of gripping fingers to engage with and support the container during air-conveying the container along a manufacturing assembly. Accordingly, the handing valley 240 provides a separation between the tamper evidence ledge 212 and the threads 216 that is suitable for receiving the pair of gripping fingers, as described herein. It is contemplated that the finish portion 184 may be implemented with any of various separations between the tamper evidence ledge 212 and the threads 216, without limitation, so long as the separation is greater than the width of the gripping fingers.

Moreover, the handling valley 240 can comprise a portion of the finish 184 that has a wall thickness and a diameter that are substantially similar to the wall thickness and diameter of the neck portion 196. As such, the handling valley 240 and the neck portion 196 enable the gripping fingers to advantageously engage with and support the container during air-conveying the container along the manufacturing assembly. Similar to the handling valley 160, described in connection to FIG. 3, the handling valley 240 enables the container to be transported along the manufacturing line by alternatingly engaging the gripping fingers with the handling valley 240 and the neck portion 196.

The articles and various embodiments described herein may be made from any suitable thermoplastic material, such as polyesters including polyethylene terephthalate (PET), polyolefins, including polypropylene and polyethylene, polycarbonate, polyamides, including nylons (e.g. Nylon 6, Nylon 66, MXD6), polystyrenes, epoxies, acrylics, copolymers, blends, grafted polymers, and/or modified polymers (monomers or portion thereof having another group as a side group, e.g. olefin-modified polyesters). These materials may be used alone or in conjunction with each other. More specific material examples include, but are not limited to, ethylene vinyl alcohol copolymer ("EVOH"), ethylene vinyl acetate ("EVA"), ethylene acrylic acid ("EAA"), linear low density polyethylene ("LLDPE"), polyethylene 2,6- and 1,5-naphthalate ("PEN"), polyethylene terephthalate glycol ("PETG"), poly(cyclohexylenedimethylene terephthalate), polystryrene, cycloolefin, copolymer, poly-4-methylpentene-1, poly(methyl methacrylate), acrylonitrile, polyvinyl chloride, polyvinylidine chloride, styrene acrylonitrile, acrylonitrile-butadiene-styrene, polyacetal, polybutylene terephthalate, ionomer, polysulfone, polytetra-fluoroethylene, polytetramethylene 1,2-dioxybenzoate and copolymers of ethylene terephthalate and ethylene isophthalate. In certain embodiments preferred materials may be virgin, pre-consumer, post-consumer, regrind, recycled, and/or combinations thereof.

In some embodiments, polypropylene also refers to clarified polypropylene. As used herein, the term "clarified polypropylene" is a broad term and is used in accordance with its ordinary meaning and may include, without limitation, a polypropylene that includes nucleation inhibitors and/or clarifying additives. Clarified polypropylene is a generally transparent material as compared to the homopolymer or block copolymer of polypropylene. The inclusion of nucleation inhibitors helps prevent and/or reduce crystallinity, which contributes to the haziness of polypropylene, within the polypropylene. Alternatively, nucleation inhibitors may be added to polypropylene.

As used herein, "PET" includes, but is not limited to, modified PET as well as PET blended with other materials. One example of a modified PET is IP A-modified PET, which refers to PET in which the IP A content is preferably more than about 2% by weight, including about 2-10% IP A by weight, also including about 5-10% IP A by weight. In another modified PET, an additional comonomer, cylohexane dimethanol ("CHDM") is added in significant amounts (e.g. approximately 40% by weight or more) to the PET mixture during manufacture of the resin.

Additives may be included in articles herein to provide functional properties to the resulting containers. Such additives include those providing enhanced gas barrier, UV protection, scuff resistance, impact resistance and/or chemical resistance. Preferred additives may be prepared by methods known to those of skill in the art. For example, the additives may be mixed directly with a particular material, or they may be dissolved/dispersed separately and then added to a particular material. Additives may be present in an amount up to about 40% of the material, also including up to about 30%, 20%, 10%, 5%, 2% and 1% by weight of the material. In some embodiments, additives may be present in an amount less than or equal to 1% by weight, such ranges of materials including, but not limited to, about 0.01% to about 1%, about 0.01% to about 0.1%, and about 0.1% to about 1% by weight.

Another possible additive is microparticulate clay or graphene based materials. These materials comprise tiny, micron or sub-micron size (diameter), particles of materials which enhance the barrier and/or mechanical properties of a material by creating a more tortuous path for migrating gas molecules, such as oxygen or carbon dioxide, to take as they permeate a material and/or providing added stiffness. In some embodiments, nanoparticulate material is present in amounts ranging from 0.05 to 1% by weight, including 0.1%, 0.5% by weight and ranges encompassing these amounts. In some embodiments, nanoparticles comprise monmorillonite that may be modified with a ternary or quaternary ammonium salt. In some embodiments, such particles comprise organoclays as described in U.S. Pat. No. 5,780,376, the entire disclosure of which is hereby incorporated by reference and forms part of the disclosure of this application. Other suitable organic and inorganic microparticulate clay based or nano-sized products may also be used. Both man-made and natural products are also suitable.

In some embodiments, the UV protection properties of the material may be enhanced by the addition of one or more additives. In one embodiment, the UV protection material used provides UV protection up to about 350 nm or less, preferably about 370 nm or less, more preferably about 400 nm or less. The UV protection material may be used as an additive with layers providing additional functionality or applied separately as a single layer. In some embodiments, additives providing enhanced UV protection are present in the material from about 0.05 to 20% by weight, but also including about 0.1%, 0.5%, 1%, 2%, 3%, 5%, 10%, and 15% by weight, and ranges encompassing these amounts. In some embodiments, the UV protection material is added in a form that is compatible with the other materials. In some embodiments, a preferred UV protection material comprises a polymer grafted or modified with a UV absorber that is added as a concentrate. Other preferred UV protection materials include, but are not limited to, benzotriazoles, phenothiazines, and azaphenothiazines. UV protection materials may be added during the melt phase process prior to use, such as prior to injection molding or extrusion.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A preform suitable for being blow-molded to form a container, the preform comprising:
   a finish portion including an opening to an interior of the preform and including a tamper evidence ledge;

a neck portion adjacent to the tamper evidence ledge;
a tapered portion configured to transition from a diameter of the neck portion to a diameter of a cylindrical portion comprising an elongate member that culminates in an end cap;
one or more threads disposed on the finish portion and configured to threadably receive a cap, wherein the one or more threads share an adjacent intervening valley configured to allow passage of a thread disposed in the cap; and
a handling valley disposed between the tamper evidence ledge and the one or more threads, the handing valley extending circumferentially around the finish portion and having a diameter less than a diameter of the intervening valley and substantially similar to a diameter of the neck portion on the opposite side of the tamper evidence ledge from the opening.

2. The preform of claim 1, wherein the handling valley and the neck portion enable gripping fingers to engage with and support the container during conveying of the container along a manufacturing assembly.

3. The preform of claim 1, wherein the tamper evidence ledge comprises a rounded upper portion and a substantially flat lower portion.

4. The preform of claim 3, wherein the rounded upper portion facilitates passing a tamper evident ring portion of the cap over the tamper evidence ledge during assembly of the cap onto the container, and wherein the flat lower portion is configured to retain the tamper evident ring positioned below the tamper evidence ledge during loosening of the cap, causing the tamper-evident ring to break loose from the cap.

5. The preform of claim 1, wherein the tapered portion comprises a wall thickness that smoothly transitions from a wall thickness of the neck portion to a greater wall thickness of the cylindrical portion, the wall thickness of the tapered portion and the wall thickness of the cylindrical portion being suitable for being blow-molded into a predetermined shape and size of the container.

6. The preform of claim 1, wherein the finish portion comprises a bevel disposed at a beginning of the opening and configured to enter into sliding contact with a sealing flange of the cap.

7. The preform of claim 6, wherein the bevel is configured to compress the sealing flange to a predetermined degree so as to form a tight seal suitable to retain pressurized contents within the container.

8. The preform of claim 1, wherein the finish portion includes a stepped interior.

9. The preform of claim 8, wherein the stepped interior includes a first surface with a first diameter and a second surface with a second diameter less than the first diameter.

10. A preform suitable for being blow-molded to form a container, the preform comprising:
a finish portion including an opening to an interior of the preform and including a tamper evidence ledge;
a neck portion adjacent to the tamper evidence ledge;
a tapered portion configured to transition from a diameter of the neck portion to a diameter of a cylindrical portion comprising an elongate member that culminates in an end cap;
one or more threads disposed on the finish portion and configured to threadably receive a cap, wherein the one or more threads share an adjacent intervening valley configured to allow passage of a thread disposed in the cap; and
a handling valley disposed between the tamper evidence ledge and the one or more threads, the handing valley extending circumferentially around the finish portion and having a diameter less than a diameter of the intervening valley and nearer in dimension to a diameter of the neck portion on the opposite side of the tamper evidence ledge from the opening than to the diameter of the intervening valley.

11. The preform of claim 10, wherein the finish portion includes a stepped interior.

12. The preform of claim 11, wherein the stepped interior includes a first surface with a first diameter and a second surface with a second diameter less than the first diameter.

13. The preform of claim 10, wherein the tamper evidence ledge comprises a rounded upper portion and a substantially flat lower portion.

14. The preform of claim 13, wherein the rounded upper portion facilitates passing a tamper evident ring portion of the cap over the tamper evidence ledge during assembly of the cap onto the container, and wherein the flat lower portion is configured to retain the tamper evident ring positioned below the tamper evidence ledge during loosening of the cap, causing the tamper-evident ring to break loose from the cap.

15. A preform suitable for being blow-molded to form a container, the preform comprising:
a finish portion including an opening to an interior of the preform and including a tamper evidence ledge;
a neck portion adjacent to the tamper evidence ledge;
a tapered portion configured to transition from a diameter of the neck portion to a diameter of a cylindrical portion comprising an elongate member that culminates in an end cap;
one or more threads disposed on the finish portion and configured to threadably receive a cap, wherein the one or more threads share an adjacent intervening valley configured to allow passage of a thread disposed in the cap; and
a handling valley disposed between the tamper evidence ledge and the one or more threads, the handing valley extending circumferentially around the finish portion and having a diameter nearer in dimension to a diameter of the neck portion on the opposite side of the tamper evidence ledge from the opening than to a diameter of the intervening valley.

16. The preform of claim 15, wherein the finish portion includes a stepped interior.

17. The preform of claim 16, wherein the stepped interior includes a first surface with a first diameter and a second surface with a second diameter less than the first diameter.

18. The preform of claim 15, wherein the tamper evidence ledge comprises a rounded upper portion and a substantially flat lower portion.

19. The preform of claim 18, wherein the rounded upper portion facilitates passing a tamper evident ring portion of the cap over the tamper evidence ledge during assembly of the cap onto the container, and wherein the flat lower portion is configured to retain the tamper evident ring positioned below the tamper evidence ledge during loosening of the cap, causing the tamper-evident ring to break loose from the cap.

* * * * *